United States Patent
Kleinschmidt

(10) Patent No.: US 6,914,920 B2
(45) Date of Patent: Jul. 5, 2005

(54) METHOD FOR ENERGY STABILIZATION OF GAS DISCHARGED PUMPED IN SELECTED IMPULSE FOLLOWING DRIVEN BEAM SOURCES

(75) Inventor: Juergen Kleinschmidt, Weissenfels (DE)

(73) Assignee: Xtreme technologies GmbH, Jena (DE)

(*) Notice: Subject to any disclaimer, the term of this patent is extended or adjusted under 35 U.S.C. 154(b) by 259 days.

(21) Appl. No.: 10/360,372

(22) Filed: Feb. 7, 2003

(65) Prior Publication Data

US 2003/0161362 A1 Aug. 28, 2003

(30) Foreign Application Priority Data

Feb. 26, 2002 (DE) ......................... 102 09 160
Sep. 17, 2002 (DE) ......................... 102 44 105

(51) Int. Cl.[7] ................... H01S 3/10; H01S 3/13; H01S 3/22; H01S 3/223; G05F 1/00
(52) U.S. Cl. ................... 372/25; 372/30; 372/55; 372/57; 315/291
(58) Field of Search .............. 372/25, 29.02, 372/29.015, 30, 38.07, 55, 57; 315/291, 224, 307

(56) References Cited

U.S. PATENT DOCUMENTS 5,710,787 A   1/1998 Amada et al.
6,005,879 A  12/1999 Sandstrom et al.
6,067,306 A   5/2000 Sandstrom et al.

FOREIGN PATENT DOCUMENTS

EP   0 854 003    7/1998
EP   0 873 812   10/1998
WO   WO 01/28048  4/2001

*Primary Examiner*—Mingun Oh Harvey
*Assistant Examiner*—Armando Rodriguez
(74) *Attorney, Agent, or Firm*—Reed Smith LLP

(57) ABSTRACT

The invention is directed to a method for the energy stabilization of a gas discharge-pumped radiation source that is operated in defined pulse sequences, particularly for suppression of overshooting and undershooting of excimer lasers and EUV radiation sources in burst operation. It is the object of the invention to find a novel possibility for the stabilization of the energy emission of a gas discharge-pumped radiation source that is operated in defined pulse sequences (bursts) which makes it possible to take into account a temporary behavior of the radiation source at the beginning of every burst without repeated recalibration of the energy-voltage curve. In a method with proportional regulation of the charging voltage as a function of the measured pulse energy, the object stated above is met according to the invention in that the pulse energy $E_n^{(p)}$ to be adjusted for a current pulse in the current burst is calculated from the pulse energy of the preceding pulse in the current burst and an identical pulse $E_n^{(p-1)}$ of a preceding precursor burst, wherein the precursor burst is an unregulated model burst and the high voltage which is to be adjusted currently for the current pulse is calculated from the current pulse energy $E_n^{(p)}$ by dividing by the rise dE/dU of the function of the pulse energy depending on the charging voltage in the linear operating range of the radiation source.

10 Claims, 4 Drawing Sheets

METHOD FOR ENERGY STABILIZATION OF GAS DISCHARGED PUMPED IN SELECTED IMPULSE FOLLOWING DRIVEN BEAM SOURCES

CROSS-REFERENCE TO RELATED APPLICATIONS

This application claims priority of German Application No. 102 09 160.9, filed Feb. 26, 2002, and German Application No. 102 44 105.7, filed Sep. 17, 2002, the complete disclosures of which are hereby incorporated by reference.

BACKGROUND OF THE INVENTION a) Field of the Invention

The invention is directed to a method for the energy stabilization of a gas discharge-pumped radiation source that is operated in defined pulse sequences, particularly for suppression of overshoot and undershoot in burst operation of excimer lasers and EUV radiation sources.

b) Description of the Related Art

In addition to special lamps, mainly narrowband excimer lasers with wavelengths of 248 nm and 193 nm are currently used as radiation sources in photolithography processes for the fabrication of microchips. Methods based on $F_2$ lasers (157 nm) are in development. EUV lithography (13.5 nm) appears to be the most promising variant for next-generation lithography.

In all of these lithography processes, a mask (with the structure to be imaged) is imaged on the wafer in a scanner in a reduced manner.

The usual exposure principle in the scanners mentioned above is a burst regime, as it is called, in which the wafer is not continuously exposed (because of the special steps for manufacturing a microchip), but rather the radiation source supplies sequentially defined sequences of radiation pulses. A pulse sequence (burst) of this kind contains 100 to 400 light pulses. After every burst, there is a pause during which, e.g., the work gas can recover. After this burst pause, the radiation source supplies pulse energies at a fixed operating voltage in the following burst for the first 10 . . . 40 pulses, which pulse energies are higher than for the rest of the light pulses. This behavior is known as overshoot. Depending on the gas state, the radiation source reaches a stationary state after 10 to 40 pulses. Under certain conditions, an undershoot behavior can also be observed. This occurs when the excitation conditions for the emission of the light source worsen during the burst pause. The dose fluctuations which accordingly occur impair the photolithographic process and are therefore undesirable.

The method described above has also been observed in narrowband excimer lasers. Because of the altered conditions in the burst pause, the first pulses in the burst are subject to deviations from the reference wavelength, a wavelength shift, as it is called. In this case, the aim is to reduce this wavelength shift (overshoot/undershoot shift) to below a determined acceptable value.

A regulation of energy of the kind mentioned above for narrowband excimer lasers is described in U.S. Pat. No. 6,005,879 as follows. For the first 10 . . . 40 pulses in the burst, a learning table for the charging voltage U is stored in the control computer. This learning table results from the behavior of the first pulses of the preceding bursts and is continuously updated based on the current burst. The voltage values stored in the learning table are taken into account in a modified PI regulation.

A similar procedure is followed for wavelength stabilization. In this case, the wavelength-controlling optical component (e.g., the grating of the narrowband unit) is rotated during the burst pause until the wavelength shift is reduced.

In all of the known regulations, the radiation sources are regulated differently during the start phase of the burst than during the subsequent stationary phase. Another disadvantage of the known algorithm consists in that coefficients of the PID regulation have fixed values which are determined empirically at the start. However, the pulse statistics change over the gas lifetime of the excimer laser, so that these factors must be repeatedly optimized by trial and error. This means extensive on-site measurements of the equipment by service engineers. Further, it is not easy to compensate for the starting behavior at the beginning of every burst when constant discharge conditions cannot be taken as a basis.

OBJECT AND SUMMARY OF THE INVENTION

It is the primary object of the present invention to find a novel possibility for the stabilization of the energy emission of a gas discharge-pumped radiation source that is operated in defined pulse sequences (bursts) which makes it possible to take into account a temporary behavior of the radiation source at the beginning of every burst without repeated recalibration of the energy-voltage curve.

In a method for energy stabilization of a gas discharge-pumped radiation source operated in defined pulse sequences (bursts) in which a high voltage is regulated as charging voltage for triggering the gas discharge-pumped energy radiation through a proportional regulation as a function of the measured pulse energy, the object stated above is met according to the invention in that the pulse energy $E_n^{(p)}$ to be adjusted for a current pulse in the current burst is calculated from the pulse energies of a preceding pulse $E_{n-1}^{(p)}$ in the current burst and of an identical pulse $E_n^{(p-1)}$ of a preceding precursor burst, wherein at least one unregulated model burst which found the same excitation conditions as the current burst is used as a precursor burst, and a suitable starting value is set as the precursor energy value of the first pulse in the current burst, and in that the high voltage to be adjusted for the current pulse is calculated from the currently calculated pulse energy $E_n^{(p)}$ by dividing by the slope or rise $dE/dU$ of the function of the pulse energy depending on the high voltage in the linear operating range of the radiation source.

In order to detect unregulated model bursts, an unregulated burst regime is switched to automatically in planned irradiation pauses. In so doing, energy values of one or more model bursts are received and stored.

The high voltage to be adjusted is advantageously calculated using the following equation:

$$U_n^{(p)} = U_{n-1}^{(p)} + \{m + a[(2E_S - E_n^{(p-1)}) - (E_{n-1}^{(p)} + m) + r]\}/(dE/dU),$$

where an unregulated model burst with identical discharge conditions is used as respective pulse energy $E_n^{(p-1)}$ of the associated precursor burst. In this connection, $E_S$ represents the sought for target value of the pulse energy, or set energy, as it is called, $U_{n-1}^{(p)}$ represents the charging voltage for the precursor pulse in the current burst, and $dE/dU$ represents the rise of the E(U) curve at the operating point $E_S(U_S)$ of the set energy. Values m and r represent noise values during the measurement of the pulse energy or when adjusting the high voltage, where r is the inaccuracy in the adjustment of charging voltage, and m is the measurement error during the measurement of the pulse energy.

In order to compensate for the temporarily erroneous energy emissions (overshoot or undershoot) of the first pulses of the current burst, the rule mentioned above is applied at least for the starting phase of the first pulses of the burst (e.g., the first 10 to 40 pulses depending on burst length). In a preferable variant, the charging voltage to be adjusted is calculated for every pulse within the entire burst according to the equation shown above.

In order that the calculation of the current values for the charging voltage to be adjusted is free from statistical variations of individual model bursts, the charging voltage for the pulses of the current burst is advantageously calculated according to the following equation:

$$U_n^{(p)} = U_{n-1}^{(p)} + \{m + a[(2E_S - \langle E_n^{(p-1)} \rangle) - (E_{n-1}^{(p)} + m) + r]\}/(dE/dU),$$

where an averaged model burst is used for the respective pulse energy values of the precursor burst, the pulse energy values $\langle E_n^{(p-1)} \rangle$ of this averaged model burst being calculated by averaging associated energy values from a defined quantity of unregulated precursor bursts under the same discharge conditions.

The target value of the pulse energy, that is, the set energy $E_S$, can advantageously be used instead of an empirical estimated value as a starting value for the energy of the precursor pulse $E_{n-1}^{(p)}$ for regulating the first pulse in the current burst according to one of the equations above.

A pulse energy value $E_n^{(p-1)}$ originating from a stationary part of the energy emissions of the unregulated precursor burst is preferably taken from an unregulated precursor burst as a starting value for the energy of the precursor pulse $E_{n-1}^{(p)}$ for regulating the first pulse in the current burst.

A starting value of this kind can also be an average from like energy values $E_n^{(p-i)}$ of a defined quantity of unregulated model bursts, wherein the energy value of the same pulse of the unregulated precursor burst from its stationary state of the energy emission, preferably the last pulse energy value of the precursor burst, is used for averaging.

In the event that an averaged model burst from averaged associated energy values of a defined quantity of unregulated precursor bursts is used as an unregulated precursor burst for regulation and is accordingly stored, it is particularly advantageous to use an averaged pulse energy value $\langle E_n^{(p-i)} \rangle$ of the averaged precursor burst as starting value for regulation, wherein the pulse energy value $\langle E_n^{(p-i)} \rangle$ to be used as a starting value is selected from a stationary part of the energy values of the averaged unregulated precursor burst.

The fundamental idea of the invention is based on the idea that the gas discharge statistics change substantially over the life of the radiation source, i.e., over many pulse sequences (bursts), and within a burst after a recovery phase of the work gas, e.g., in a burst pause. Consequently, all proportional regulation for energy stabilization which is supported solely on the pulse energy charging voltage characteristic of the radiation source is no longer sufficiently accurate after a certain period of operation in the burst regime or must be recalibrated (optimized) regularly. Therefore, aside from taking into account measurement errors and adjusting errors, the invention utilizes a statistical detection of the energy values and voltage values per pulse and burst and a curve characteristic of at least one model burst particularly in order to suppress the known overshoot behavior at the beginning of every burst.

The essence of the method consists in that it is a prediction method in which the next value of the pulse energy in the actual burst is predicted on the basis of knowledge of the energy value of the precursor pulse of the same burst and of the behavior of determined unregulated model bursts whose energy values were received under the same or similar discharge conditions. With the predicted anticipated energy of the n-th pulse and the set energy as target energy value, the charging voltage can then be adjusted in such a way that the energy of the regulated current pulse coincides very closely with the set energy over the entire burst.

Accordingly, it is possible with the method according to the invention to achieve a stabilization of the energy emission of a gas discharge-pumped radiation source operated in defined pulse sequences (bursts) which makes it possible to take into account a temporary behavior of the radiation source at the beginning of every burst without repeated calibration of the energy-voltage curve.

The invention will be described more fully in the following with reference to an embodiment example.

BRIEF DESCRIPTION OF THE DRAWINGS

In the drawings:

FIG. 1b shows the value $U_n^{(p)} \cdot dE/dU$ determined for calculating the charging voltage according to equation (7) as a function of the pulse number n based on the (unregulated) burst sequence of FIG. 1a;

FIG. 1c shows the overshoot compensation with $E_n^{(p)} + (\langle E_n^{(p-1)} \rangle - E_S)$ as a function of the pulse number n based on FIG. 1a;

FIG. 1d shows the overshoot compensation with $E_n^{(p)} + (E_n^{(p-1)} - E_S)$ as a function of the pulse number n based on FIG. 1a;

FIG. 2b shows the value $U_n^{(p)} \cdot dE/dU$ determined for calculating the charging voltage according to equation (7) based on the burst behavior according to FIG. 2a;

FIG. 2c shows the overshoot compensation for $E_n^{(p)} + (\langle E_n^{(p-1)} \rangle - E_S)$ as a function of the pulse number n based on FIG. 2a; and FIG. 2d shows the overshoot compensation for $E_n^{(p)} + (E_n^{(p-1)} - E_S)$ as a function of the pulse number n based on FIG. 2a.

DESCRIPTION OF THE PREFERRED EMBODIMENTS

Figure 1A:
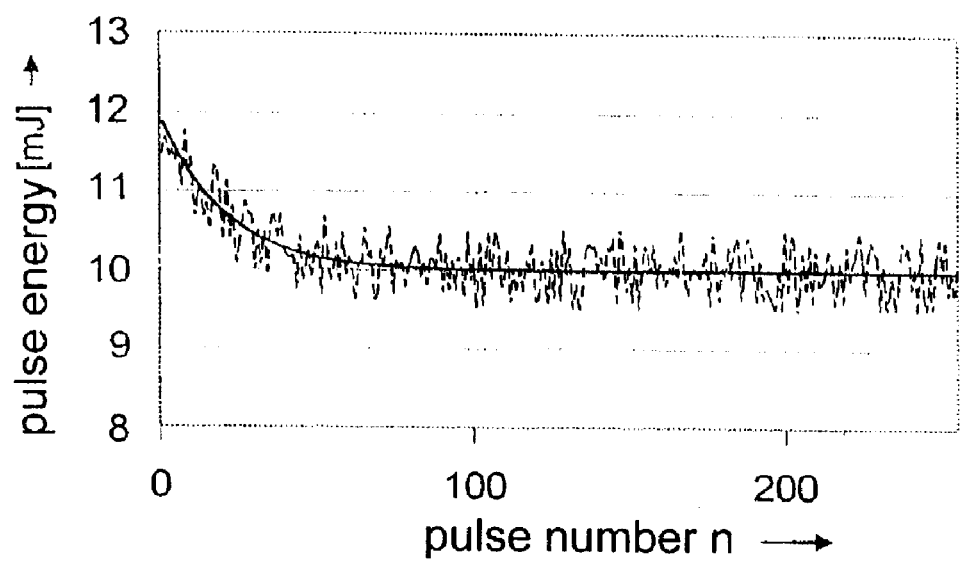
FIG. 1a shows the pulse energy $E_n^{(p-1)}$ of an unregulated model burst (dashed curve) and the averaged pulse energy $\langle E_n^{(p-1)} \rangle$ (solid curve) as a function of the pulse number n with a decay time of 20 pulses.

In its basic embodiment, the method for energy stabilization of a gas discharge-pumped radiation source operated in defined pulse sequences (bursts) has the following steps:

measurement and storage of the pulse energies $E_i^{(p-1)}$ of the radiation pulses of an unregulated sequence of radiation pulses (model burst), measurement and storage of the pulse energies of the radiation pulses of every regulated burst, calculation of the pulse energy $E_n^{(p)}$ to be adjusted for a current pulse in the current burst from the pulse energy $E_{n-1}^{(p)}$ of the preceding pulse of the current (p-th) burst and the pulse energy $E_i^{(p-1)}$ of an identical pulse of a previous precursor burst, wherein the precursor burst is an unregulated model burst finding approximately the same excitation conditions as the current burst, calculation of the charging voltage $U_n$ to be adjusted currently for the current pulse from the currently calculated pulse energy $E_n^{(p)}$ using the rise dE/dU of the function of the pulse energy depending on the charging voltage in the linear operating range of the radiation source, and adjustment of the charging voltage $U_n$ for the current radiation pulse.

According to the principles of proportional regulation, the set energy for the n-th pulse $E_n$ can be calculated according to equation (1)

$$E_n = E_{n-1} + a(E_S - E_{n-1}) \qquad (1)$$

In the equation, a represents a fixed regulating factor, $E_S$ is the set energy value and $E_{n-1}$ is the energy measurement value for the (n-1)-th pulse (precursor pulse).

The charging voltage $U_n$ can be calculated from equation (1) by multiplying by $dE/dU$. $U_n$ is the voltage to be adjusted at the network device for the next, n-th pulse $$U_n = U_{n-1} + a(E_S - E_{n-1})/(dE/dU) \qquad (2)$$

The method according to the invention is based on the fact that there is already a regulating procedure that stabilizes the pulse energy $E_n$ over the entire lifetime of the radiation source at a fixed target value known as the set energy $E_S$.

For this purpose, the pulse energy $E_{n-1}$ is measured by an energy monitor during each shot (radiation pulse) of the radiation source. However, because of the noise of the measuring apparatus, the pulse energy $E_{n-1}$ is only accurately measurable up to a measurement error m. Further, an error r occurs for example, during the adjustment to the new charging voltage $U_n$ at the high-voltage source (network device). Therefore, equation (1) is modified in the following manner:

$$E_n = (E_{n-1} + m_{n-1}) + a[E_S - (E_{n-1} + m_{n-1}) + r_n]. \qquad (3)$$

$E_S$ is the target value (set energy) which should be adjusted as well as possible.

The measurement error and adjusting error m and r are noncorrelated noise values, so that the following can be given for $i \neq k$:

$$\langle m_i m_k \rangle = 0 \quad \langle r_i r_k \rangle = 0 \quad \langle m_i r_k \rangle = 0 \qquad (4)$$
$$\langle m_i m_i \rangle = M \quad \langle r_i r_i \rangle = R \quad \langle m \rangle = 0, \langle r \rangle = 0.$$

When $M = \langle m\, m \rangle$, the mean square error of the measurement of the pulse energy is given by the measurement accuracy of the energy detector. Analogous to this, $R = \langle r\, r \rangle$ is the mean square error in the adjustment of the charging voltage and is determined by the voltage noise of the network device.

When $\sigma_n^2 = \langle (E_S - E_n)^2 \rangle$, a standard deviation can accordingly be derived from (3):

$$\sigma_n^2 = (\sigma_{n-1}^2 + M)(1-a) + a^2 R, \qquad (5)$$

where a is selected in such a way that $\sigma_n^2 = \langle (E_S - E_n)^2 \rangle$ assumes a minimum, i.e., $(\partial \sigma_n^2/\partial a) = 0$. This gives simple equations for determining the mean square deviation $\sigma_n^2$ and the regulating factor a which can accordingly be continuously adapted.

It is assumed in the following that an optimal regulating factor a is found. A suitable possibility for determining an optimal regulating factor a is thoroughly described, for example, in the previously published patent application DE 102 09 161.7.

The procedure is designed so that it can be applied to values which change quickly and temporarily over time, e.g., with short-term energy fluctuations (overshoot or undershoot) in the switch-on phase of the radiation source in burst operation (start of burst).

In order to compensate for overshoot or undershoot energy emissions of the radiation source, equation (3) is modified in the following way:

$$E_n^{(p)} = (E_{n-1}^{(p)} + m) + a[(2E_S - E_n^{(p-1)}) - (E_{n-1}^{(p)} + m) + r]. \qquad (6)$$

In this case, the target value is no longer a constant energy value $E_S$, but the value $(2E_S - E_n^{(p-1)})$. This target value depends on the pulse number n and is itself determined by the energy values $E_n^{(p-1)}$ of previous unregulated model bursts.

The pulse energy $E_n^{(p)}$ for the n-th pulse in the (current) p-th burst is calculated from the pulse energy of the preceding (n-1)-th pulse $E_{n-1}^{(p)}$ in the same burst and the n-th pulse $E_n^{(p-1)}$ of the (p-1)-th burst (precursor burst). In this case, $E_S$ is again the set energy to which stabilization is carried out by means of proportional regulation (preferably with continuously adapted regulating factor a).

In an advantageous manner, $E_{n-1}^{(p)} = E_0^{(p)} = E_S$ is used as a starting value for the calculation at the start of every burst. However, other meaningful starting values can also be used, e.g., a stored empirical energy value, a pulse energy value from a part of the stationary pulse behavior of an (unregulated) precursor burst or of an averaged precursor burst.

The high voltage $U_n^{(p)}$ for the (next) n-th pulse in the p-th burst can then be calculated from equation (6):

$$U_n^{(p)} = U_{n-1}^{(p)} + \{m + a \cdot [(2E_S - E_n^{(p-1)}) - (E_{n-1}^{(p)} + m) + r]\}/(dE/dU). \qquad (7)$$

In this connection, $dE/dU$ is the rise of the E(U) curve at the point of the set energy $E_S$ and is empirically known.

In equations (6) and (7), the (p-1)-th burst represents a suitable precursor burst only by way of example. However, as a rule, it will not be a direct precursor burst.

The (p-1)-th precursor burst must be a model burst in the unregulated case which has found approximately the same excitation conditions as the p-th burst to be regulated. Experience has shown that the amplitude of an overshoot or undershoot is a defined function of the "out time" (time period between two successive bursts during which the radiation source does not emit). This means that it may be advisable or even necessary to apply a plurality of data records of pulse energy values of typical model bursts (i.e., for out times of different duration) which are possible and typical for the operation regime of the radiation source. As will be described more fully in the following, such data records with energy values of typical model bursts can be modified with respect to their individual pulse energy values additionally by continuously adopting energy values of additional unregulated bursts (with comparable discharge conditions in every case) to form an averaged precursor burst in order to increase reliability and adapt in a sliding (but delayed) manner.

When an average model burst (as is shown by the solid curves in FIGS. 1a and 2a) is used with the average pulse energy values $\langle E_n^{(p-1)} \rangle$ for regulation, the regulation can be stabilized and the calculation of the current charging voltage is carried out in the following form:

$$U_n^{(p)} = U_{n-1}^{(p)} + \{m + a[(2E_S - \langle E_n^{(p-1)} \rangle) - (E_{n-1}^{(p)} + m) + r]\}/(dE/dU). \qquad (8)$$

In this case, $\langle E_n^{(p-1)} \rangle$ is given by the average of the respective n-th energy values of k equivalent model bursts:

$$\langle E_n^{p-1}\rangle = \left(\sum_{i=1}^{k} \cdot E_n^{p-i}\right) \Big/ k, \text{ where } 0 < k < p$$

In this example, the first pulse energy value $\langle E_1^{(p-i)}\rangle$ of an averaged precursor burst is advantageously used as a starting value for the regulation of the current burst, since the pulse energy values are already stored by averaging associated energy values of unregulated model bursts and a relatively reliable starting value is accordingly given, although there is no current precursor pulse per se. In this case, the first radiation pulse of the burst is likewise regulated.

The method is explained further with reference to results of a trial simulation with the following parameters:

$E_S$=10 mJ, overshoot=20%
r=✕0.5 mJ, M=0.1 R         (9)

(r, m: equally distributed random numbers).

FIG. 1a shows the energy curve which is accordingly determined for an unregulated burst with overshoot. The dashed line shows the actually measured energy values $E_n^{(p-1)}$ of an individual unregulated precursor burst and the solid line represents an "averaged" model burst from energy values $\langle E_n^{(p-1)}\rangle$ which are averaged depending on the pulse number n over k unregulated precursor bursts.

The decay time of the overshoot in this example is 20 pulses.

Figure 1B:
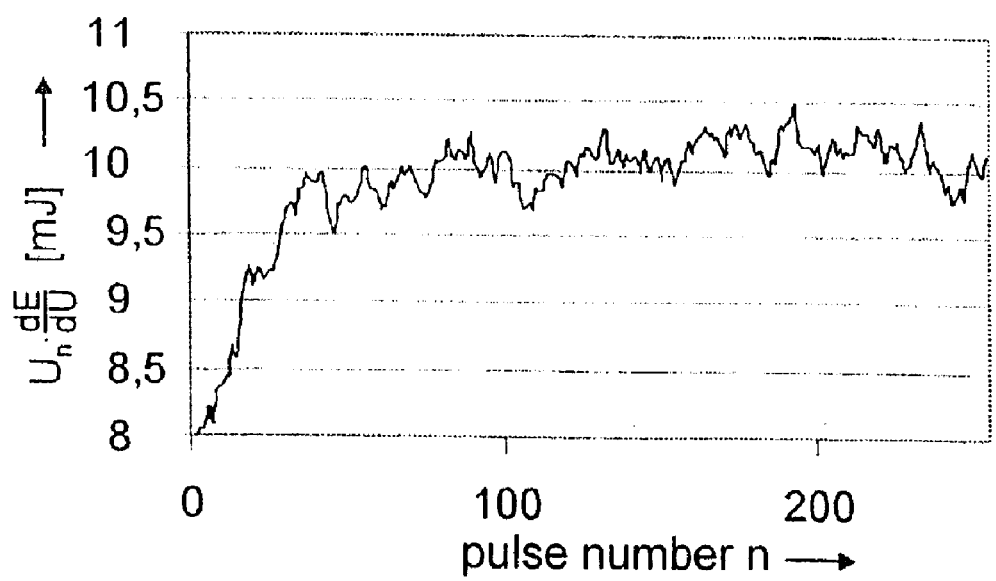

FIG. 1b shows the value $U_n^{(p)}$dE/dU (in mJ units) which is calculated by means of equation (7) for calculating the high voltage $U_n^{(p)}$ as a function of the pulse number for an (unregulated) model burst. An optimized value of a=0.27 was used for the regulation factor a applied in equation (7). This optimal regulating factor can be constantly re-regulated (e.g., by means of the method described in DE 102 09 161.7), i.e., it can be adapted in a sliding manner, e.g., to changes in the discharge characteristic of the radiation source and was determined for the computational example by the assumptions made in equations (9).

Figure 1C:
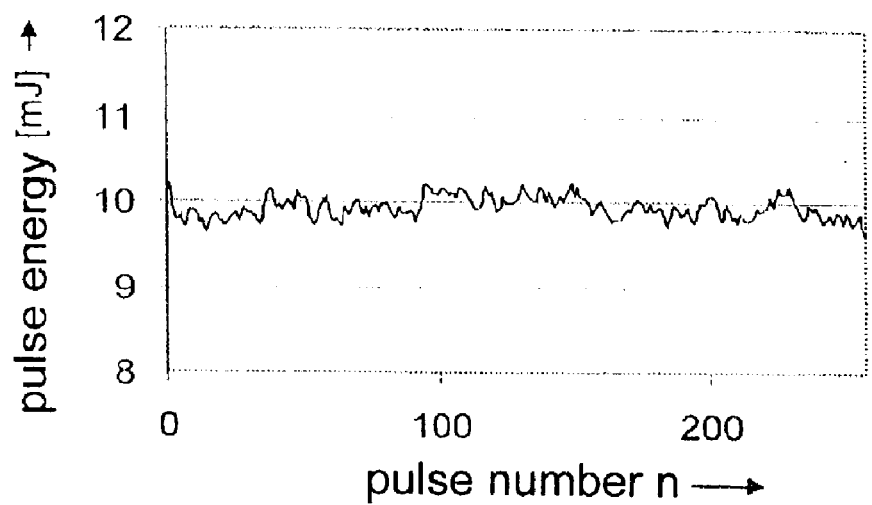

FIG. 1c shows the time curve of the pulse energy $E_n^{(p)}$+ ($\langle E_n^{(p-1)}\rangle$–$E_S$) for the individual pulses within a burst based on a time-averaged model burst. This value is a measurement for the quality of the overshoot compensation (deviation from the target value, the set energy $E_S$=10 mJ). In this connection, the values $\langle E_n^{(p-1)}\rangle$ in FIG. 1c correspond to the averaged pulse energies of the averaged precursor burst shown as a solid curve in FIG. 1a.

Figure 1D:
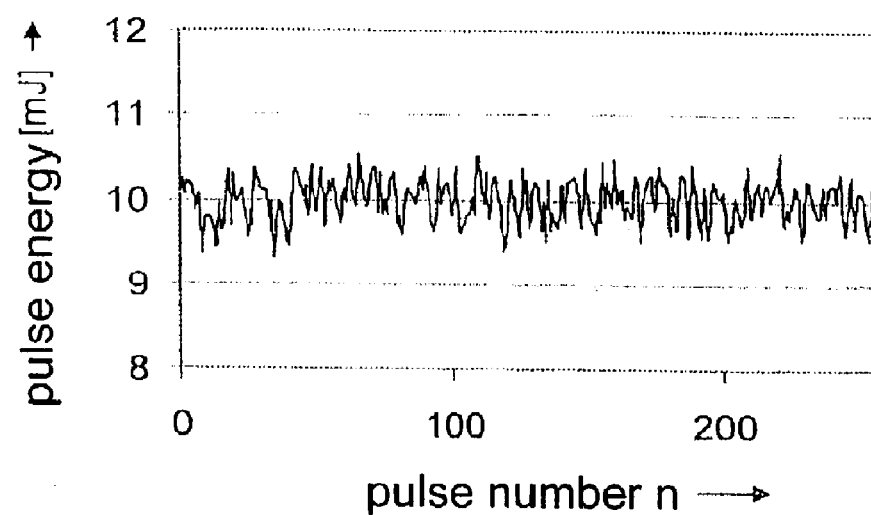

On the other hand, FIG. 1d shows an energy regulation based on the value $E_n^{(p)}$+($E_n^{(p-1)}$–$E_S$). The values $E_n^{(p-1)}$ are the noisy energy values of the model burst from FIG. 1a which are currently associated with the pulse number. This procedure may be necessary because of certain real-time requirements for pulse-exact voltage regulation when time averaging proves too slow. However, FIG. 1d shows that the selected regulation principle also delivers adequate results for this inferior variant.

The time constant of the regulation (indicated as pulse number n) is 1/a. If 1/a is greater than the decay time of the overshoot (or the rise time of an undershoot), full compensation is no longer possible. In order to illustrate this, the decay time of the overshoot of 5 pulses was set for a burst arbitrarily a=0.05 (1/a=20) with all other regulating conditions remaining the same. The results are shown in FIGS. 2a–2d.

Figure 2A:
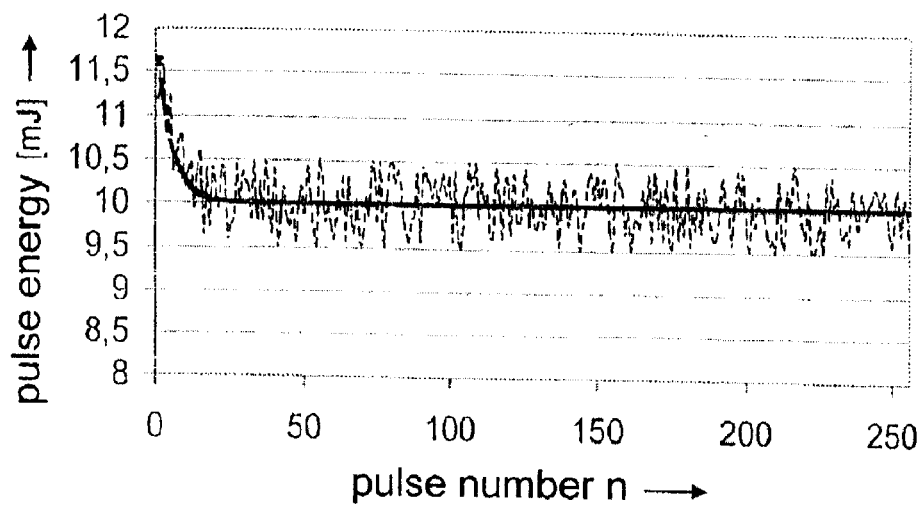
FIG. 2a shows the pulse energy $E_n^{(p-1)}$ of a model burst and an averaged pulse energy $\langle E_n^{(p-1)} \rangle$ as a function of the pulse number n at a decay time of 5 pulses.
Figure 2B:
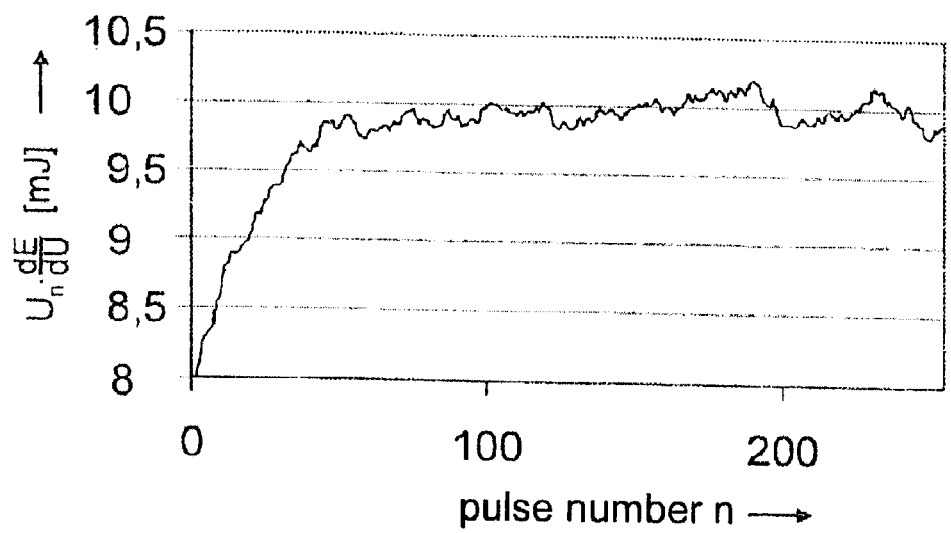
Figure 2C:
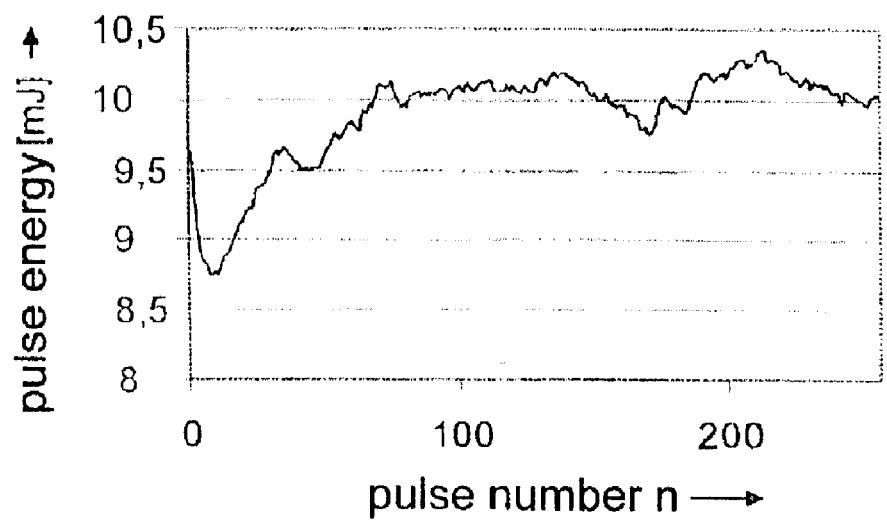
Figure 2D:
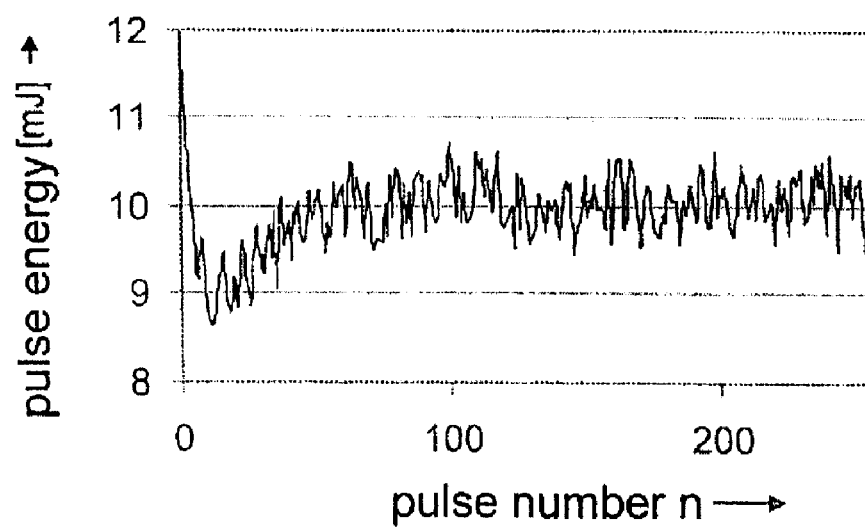

FIGS. 2a and 2b reflect the situation for the above-mentioned shortened decay time (5 pulses) of the unregulated model burst (analogous to the illustrations in FIGS. 1a and 1b). FIGS. 2c and 2d clearly show that the overshoot was not completely compensated. Again, it is not important which representation of the overshoot compensation, $E_n^{(p)}$+ ($\langle E_n^{(p-1)}\rangle$–$E_S$) or $E_n^{(p)}$+($E_n^{(p-1)}$–$E_S$), is considered as a function of the pulse number.

These results illustrate the limits of the regulating method. But it must be remarked that a>0.1 for typical ratios M/R (given by the average measurement error and the voltage noise of the network equipment) and the overshoot decay time is usually greater than the duration of 10 pulses. The regulation according to the invention accordingly functions sufficiently reliably.

Other design variants are possible without departing from the framework of this invention. It was assumed in the example described in the preceding that the pulse energy is regulated with control of the charging voltage based on the pulse energy of the preceding pulse in the current burst and based on the pulse energy of a target value, the set energy, of a model burst. However, as evidenced by the embodiment examples, it must be assumed only that the model burst is an unregulated precursor burst and all allocations of pulse energy values from a model burst of this type (possibly also averaged) are understood equally clearly as belonging to the teaching according to the invention insofar as the regulation is based on a preceding energy value from the current burst and from a similarly defined model burst without inventive activity, so that a sufficient overshoot or undershoot compensation is possible.

While the foregoing description and drawings represent the present invention, it will be obvious to those skilled in the art that various changes may be made therein without departing from the true spirit and scope of the present invention.

What is claimed is:

1. A method for the energy stabilization of a gas discharge-pumped radiation source that is operated in defined pulse sequences (bursts), in which a high voltage is regulated as charging voltage for triggering the gas discharge-pumped energy radiation through a proportional regulation depending on the measured pulse energy, comprising the steps of:

calculating the pulse energy $E_n^{(p)}$ to be adjusted for a current pulse in the current burst from the pulse energies of a preceding pulse $E_{n-1}^{(p)}$ in the current burst and of an identical pulse $E_n^{(p-1)}$ of a preceding precursor burst;

using at least one unregulated model burst which found the same excitation conditions as the current burst as a precursor burst;

setting a suitable starting value as the precursor energy value of the first pulse in the current burst; and calculating the high voltage to be adjusted for the current pulse from the currently calculated pulse energy $E_n^{(p)}$ by dividing by the rise dE/dU of the function of the pulse energy depending on the high voltage in the linear operating range of the radiation source.

2. The method according to claim 1, wherein the high voltage to be adjusted is calculated using the following equation:

$$U_n^{(p)}=U_{n-1}^{(p)}+\{m+a[(2E_S-E_n^{(p-1)})-(E_{n-1}^{(p)}+m)+r]\}/(dE/dU),$$

where an unregulated model burst with identical discharge conditions is used for the pulse energy $E_n^{(p-1)}$ of the associated precursor burst, $E_S$ represents the sought for target value of the pulse energy, the set energy, and m and r represent noise values during the measurement of the pulse energy and during adjustment of the high voltage.

3. The method according to claim 2, wherein the high voltage to be adjusted is calculated only in a starting phase of the current burst using the indicated equation in order to compensate for the temporarily erroneous energy emissions of the first pulses of every burst.

4. The method according to claim 2, wherein the charging voltage to be adjusted is calculated for every pulse within the entire current burst according to the indicated equation.

5. The method according to claim 3, wherein the charging voltages for the pulses of the current burst are calculated according to the following equation:

$$U_n^{(p)} = U_{n-1}^{(p)} - \{m + a[(2E_S - <E_n^{(p-1)}>) - (E_{n-1}^{(p)} + m) + r]\}/(dE/dU),$$

where an averaged model burst is used for the respective pulse energy values of the precursor burst, the pulse energy values $<E_n^{(p-1)}>$ of this averaged model burst being calculated by averaging associated energy values from a defined quantity of unregulated precursor bursts.

6. The method according to claim 4, wherein the charging voltages for the pulses of the current burst are calculated according to the following equation:

$$U_n^{(p)} = U_{n-1}^{(p)} + \{m + a[(2E_S - <E_n^{(p-1)}>) - (E_{n-1}^{(p)} + m) + r]\}/(dE/dU),$$

where an averaged model burst is used for the respective pulse energy values of the precursor burst, the pulse energy values $<E_n^{(p-1)}>$ of this averaged model burst being calculated by averaging associated energy values from a defined quantity of unregulated precursor bursts.

7. The method according to claim 1, wherein the set energy $E_S$ is used as a starting value for the precursor pulse energy $E_{n-1}^{(p)}$ for regulating the first pulse in the current burst.

8. The method according to claim 1, wherein a pulse energy value $E_n^{(p-1)}$ originating from a stationary part of the energy emissions of the unregulated precursor burst is taken from an unregulated precursor burst as a starting value for the energy of the precursor pulse energy $E_{n-1}^{(p)}$ for regulating the first pulse in the current burst.

9. The method according to claim 8, wherein an average of stationary energy values $E_n^{(p-i)}$ with the same pulse number from a defined quantity of unregulated model bursts is used as a starting value.

10. The method according to claim 8, wherein a pulse energy value $<E_n^{(p-i)}>$ of an averaged precursor burst whose pulse energy values are calculated from a defined quantity of unregulated precursor bursts is used as a starting value, wherein the pulse energy value $<E_n^{(p-i)}>$ to be used as a starting value is selected from a stationary part of the energy values of the averaged precursor burst.

* * * * *